United States Patent
Su et al.

(10) Patent No.: US 9,374,576 B2
(45) Date of Patent: Jun. 21, 2016

(54) FUSED REGION-BASED VDR PREDICTION

(75) Inventors: Guan-Ming Su, Fremont, CA (US); Sheng Qu, San Jose, CA (US); Samir N. Hulyalkar, Los Gatos, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 223 days.

(21) Appl. No.: 14/122,221

(22) PCT Filed: May 21, 2012

(86) PCT No.: PCT/US2012/038841
§ 371 (c)(1),
(2), (4) Date: Nov. 25, 2013

(87) PCT Pub. No.: WO2012/173745
PCT Pub. Date: Dec. 20, 2012

(65) Prior Publication Data
US 2014/0098869 A1 Apr. 10, 2014

Related U.S. Application Data

(60) Provisional application No. 61/496,453, filed on Jun. 13, 2011.

(51) Int. Cl.
*H04N 7/12* (2006.01)
*H04N 19/105* (2014.01)
(Continued)

(52) U.S. Cl.
CPC ....... *H04N 19/00024* (2013.01); *H04N 19/105* (2014.11); *H04N 19/176* (2014.11);
(Continued)

(58) Field of Classification Search
USPC ............................................. 375/240, 240.14
See application file for complete search history.

(56) References Cited

U.S. PATENT DOCUMENTS

| 5,974,184 A | 10/1999 | Eifrig |
| 6,023,298 A * | 2/2000 | Hwang ................. H04N 19/51 348/699 |

(Continued)

FOREIGN PATENT DOCUMENTS

| WO | 2009/051690 | 4/2009 |
| WO | 2009/127231 | 10/2009 |

(Continued)

OTHER PUBLICATIONS

Kim, J. et al., "An Advanced Contrast Enhancement Using Partially Overlapped Sub-Block Histogram Equalization," IEEE Transactions on Circuits and Systems for Video Technology, vol. 11, Issue 4, pp. 475-484, Apr. 2001.

(Continued)

*Primary Examiner* — Allen Wong

(57) ABSTRACT

An input image is divided into non-overlapping regions. For each of the non-overlapping regions, first output data is predicted with a first prediction function, parameters related thereto and region-specific input image data. For each region with prior-predicted neighbor regions, a pixel border portion, adjacent to the neighbor region, is defined. For the pixels in the defined border portion, second output data is predicted with a second prediction function, parameters related thereto, input image data from the border portion of the current region, and input prediction parameter data from the neighbor region. The first output prediction data is fused with the second output data to predict a final set of output prediction values.

19 Claims, 4 Drawing Sheets

(51) Int. Cl.
*H04N 19/50* (2014.01)
*H04N 19/176* (2014.01)
*H04N 19/46* (2014.01)
*H04N 19/30* (2014.01)
*H04N 19/593* (2014.01)
*H04N 19/187* (2014.01)
*H04N 19/583* (2014.01)

(52) U.S. Cl.
CPC ............. *H04N19/187* (2014.11); *H04N 19/30* (2014.11); *H04N 19/46* (2014.11); *H04N 19/50* (2014.11); *H04N 19/583* (2014.11); *H04N 19/593* (2014.11)

(56) References Cited

U.S. PATENT DOCUMENTS

| | | | |
|---|---|---|---|
| 6,148,109 A | 11/2000 | Shen | |
| 6,341,144 B1 | 1/2002 | Haskell | |
| 6,983,079 B2 | 1/2006 | Kim | |
| 7,813,571 B2 | 10/2010 | Kudo | |
| 2006/0015496 A1* | 1/2006 | Keating | G06F 17/3025 |
| 2006/0159354 A1 | 7/2006 | Kim | |
| 2006/0227863 A1 | 10/2006 | Adams | |
| 2006/0227876 A1 | 10/2006 | Sherigar | |
| 2006/0269153 A1* | 11/2006 | Shi | H04N 19/56 |
| | | | 382/236 |
| 2007/0086663 A1 | 4/2007 | Lee | |
| 2009/0103615 A1* | 4/2009 | Francois | H04N 19/70 |
| | | | 375/240.12 |
| 2011/0142132 A1* | 6/2011 | Tourapis | H04N 19/00721 |
| | | | 375/240.16 |
| 2011/0200111 A1* | 8/2011 | Chen | H04N 19/52 |
| | | | 375/240.16 |
| 2013/0003855 A1* | 1/2013 | Park | H04N 19/119 |
| | | | 375/240.18 |
| 2013/0039423 A1* | 2/2013 | Helle | H04N 19/197 |
| | | | 375/240.13 |
| 2013/0148029 A1 | 6/2013 | Gish | |

FOREIGN PATENT DOCUMENTS

| | | | |
|---|---|---|---|
| WO | WO 2010017166 A2 * | 2/2010 | ....... H04N 19/00721 |
| WO | 2010/017166 | 9/2010 | |
| WO | 2012/142471 | 10/2012 | |
| WO | 2012/142506 | 10/2012 | |

OTHER PUBLICATIONS

Orchard, M. et al, "Overlapped Block Motion Compensation: An Estimation-Theoretic Approach," IEEE Transactions on Image Processing, vol. 3 Issue 5, pp. 693-699, Sep. 1994.

Zhang, K. et al, "Overlapped Block Intra Prediction," Joint Collaborative Team on Video Coding (JCT-VC) of ITU-T SG16 WP3 and ISO/IEC JCT1/SC29/WG11, Oct. 28, 2010.

List, P. et al, "Adaptive Deblocking Filter," IEEE Transactions on Circuits and Systems for Video Technology, vol. 13, Issue 7, Jul. 1, 2003.

Liao, Y. et al, "A Low Complexity Architechture for Video Coding with Overlapped Block Motion Compensation," IEEE International Conference on Image Processing, Sep. 26, 2010.

Winken, M. et al, "Bit-Depth Scalable Video Coding," IEEE International Conference on Image Processing, Sep. 1, 2007.

Wu, Y. et al, "Bit-Depth Scalability Compatible to H.264/AVC-scalable Extension," Journal of Visual Communication and Image Representation, Academic Press, Inc, vol. 19, Issue 6, Aug. 1, 2008.

Segall, A., "Scalable Coding of High Dynamic Range Video," IEE International Conference on Image Processing, Sep. 1, 2007.

Schwarz, H. et al, "Overview of the Scalable Video Coding Extension of the H.264/AVC Standard," IEEE Transactions on Circuits and Systems for Video Technology, vol. 17, Issue 9, Sep. 1, 2007.

* cited by examiner

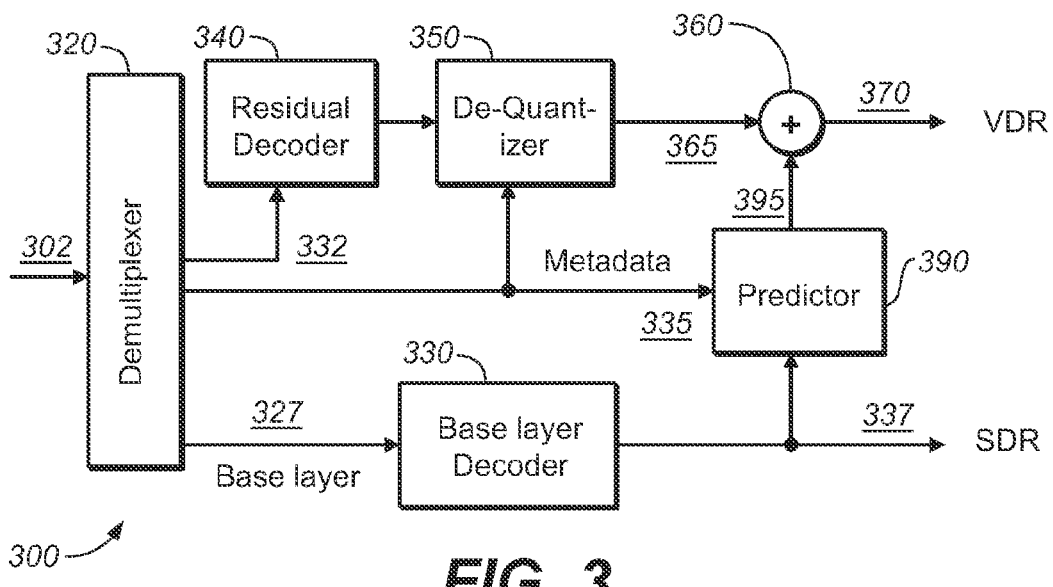
FIG. 3
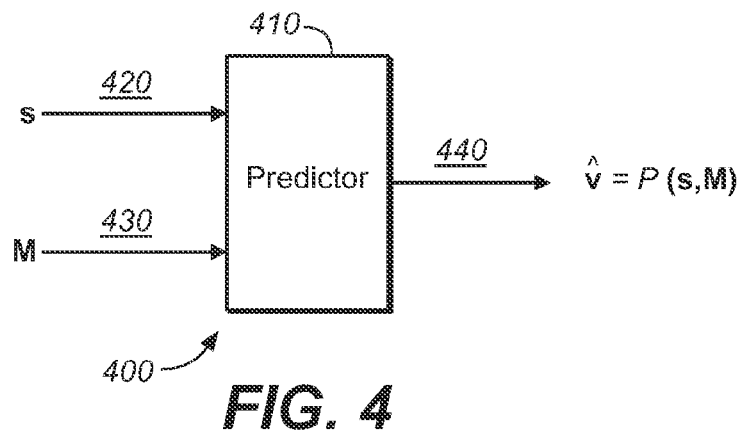
FIG. 4
| (0,0) 512 | (1,0) 514 | (2,0) 516 | (3,0) 518 |
|---|---|---|---|
| (0,1) 520 | (1,1) 522 | (2,1) 524 | (3,1) 526 |
FIG. 5

FUSED REGION-BASED VDR PREDICTION

CROSS-REFERENCE TO RELATED APPLICATIONS

This application claims priority to U.S. Provisional Patent Application No. 61/496,453 filed 13 Jun. 2011, which is hereby incorporated by reference in its entirety.

BACKGROUND

The present invention relates generally to images. More particularly, an embodiment of the present invention relates to fused, region-based, prediction in layered coding and decoding of images with high dynamic range.

As used herein, the term 'dynamic range' (DR) may relate to a capability of the human psychovisual system (HVS) to perceive a range of intensity (e.g., luminance, luma) in an image, e.g., from darkest darks to brightest brights. In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). For example, well adapted humans with essentially normal (e.g., in one or more of a statistical, biometric or opthamological sense) have an intensity range that spans about 15 orders of magnitude. Adapted humans may perceive dim light sources of as few as a mere handful of photons. Yet, these same humans may perceive the near painfully brilliant intensity of the noonday sun in desert, sea or snow (or even glance into the sun, however briefly to prevent damage). This span though is available to 'adapted' humans, e.g., those whose HVS has a time period in which to reset and adjust.

In contrast, the DR over which a human may simultaneously perceive an extensive breadth in intensity range may be somewhat truncated, in relation to HDR. As used herein, the terms 'visual dynamic range' or 'variable dynamic range' (VDR) may individually or interchangeably relate to the DR that is simultaneously perceivable by a HVS. As used herein, VDR may relate to a DR that spans 5-6 orders of magnitude. Thus while perhaps somewhat narrower in relation to true scene referred HDR, VDR nonetheless represents a wide DR breadth. As used herein, the term 'simultaneous dynamic range' may relate to VDR.

Until fairly recently, displays have had a significantly narrower DR than HDR or VDR. Television (TV) and computer monitor apparatus that use typical cathode ray tube (CRT), liquid crystal display (LCD) with constant fluorescent white back lighting or plasma screen technology may be constrained in their DR rendering capability to approximately three orders of magnitude. Such conventional displays thus typify a low dynamic range (LDR), also referred to as a standard dynamic range (SDR), in relation to VDR and HDR.

Advances in their underlying technology however allow more modern display designs to render image and video content with significant improvements in various quality characteristics over the same content, as rendered on less modern displays. For example, more modern display devices may be capable of rendering high definition (HD) content and/or content that may be scaled according to various display capabilities such as an image scaler. Moreover, some more modern displays are capable of rendering content with a DR that is higher than the SDR of conventional displays.

For example, some modern LCD displays have a backlight unit (BLU) that comprises a light emitting diode (LED) array. The LEDs of the BLU array may be modulated separately from modulation of the polarization states of the active LCD elements. This dual modulation approach is extensible (e.g., to N-modulation layers wherein N comprises an integer greater than two), such as with controllable intervening layers between the BLU array and the LCD screen elements. Their LED array based BLUs and dual (or N-)modulation effectively increases the display referred DR of LCD monitors that have such features.

Such "HDR displays" as they are often called (although actually, their capabilities may more closely approximate the range of VDR) and the DR extension of which they are capable, in relation to conventional SDR displays represent a significant advance in the ability to display images, video content and other visual information. The color gamut that such an HDR display may render may also significantly exceed the color gamut of more conventional displays, even to the point of capably rendering a wide color gamut (WCG). Scene related HDR or VDR and WCG image content, such as may be generated by "next generation" movie and TV cameras, may now be more faithfully and effectively displayed with the "HDR" displays (hereinafter referred to as 'HDR displays').

As with the scalable video coding and HDTV technologies, extending image DR typically involves a bifurcate approach. For example, scene referred HDR content that is captured with a modern HDR capable camera may be used to generate either a VDR version or an SDR version of the content, which may be displayed on either a VDR display or a conventional SDR display. In one approach, generating the SDR version from the captured VDR version may involve applying a global tone mapping operator (TMO) to intensity (e.g., luminance, luma) related pixel values in the HDR content. In a second approach, as described in U.S. application 61/376,907 "Extending Image Dynamic Range", by W. Gish et al., generating an SDR image may involve applying an invertible operator (or predictor) on the VDR data. To conserve bandwidth or for other considerations, simultaneous transmission of both the actual captured VDR content and the SDR content may not be a best approach.

Thus, an inverse tone mapping operator (iTMO), inverted in relation to the original TMO, or an inverse operator in relation to the original predictor, may be applied to the SDR content version that was generated, which allows a version of the original VDR content to be predicted. The predicted VDR content version may be compared to generated VDR content. For example, subtracting the predicted VDR version from the original VDR version may generate a residual image. An encoder may send the generated SDR content as a base layer (BL), any residual image as an enhancement layer (EL), and package the iTMO or other predictors or as metadata.

Sending the EL and metadata, with its SDR content, residual and predictors, in a bitstream typically consumes less bandwidth than would be consumed in sending both the HDR and SDR contents directly into the bitstream. Compatible decoders that receive the bitstream sent by the encoder may decode and render the SDR on conventional displays. Compatible decoders however may also use the residual image, the iTMO predictors, or the metadata to compute a predicted version of the HDR content therefrom, for use on more capable displays.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which:

FIG. 3 depicts an example layered VDR decoding systems according to an embodiment of the present invention;

FIG. 4 depicts an example prediction model according to an embodiment of the present invention;

FIG. 5 depicts an example partition of an input frame into prediction regions according to an embodiment of this invention;

DESCRIPTION OF EXAMPLE EMBODIMENTS

Figure 1:
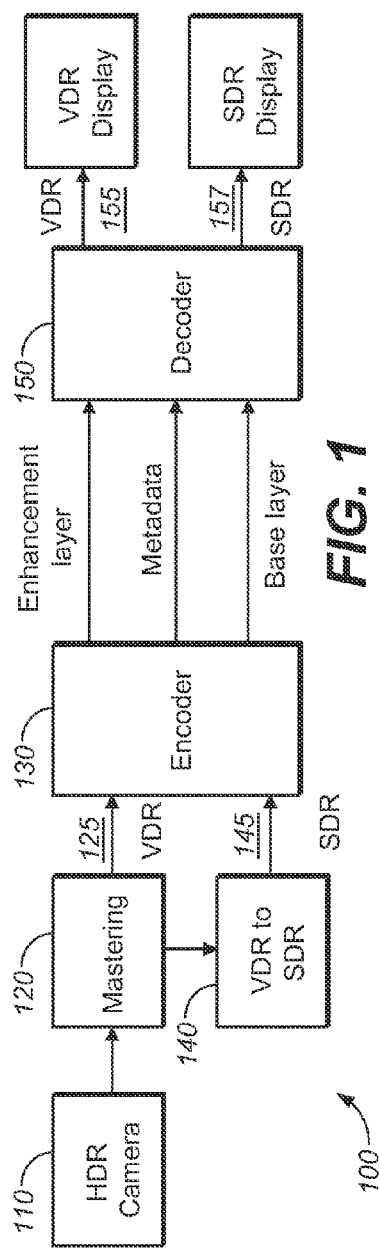
FIG. 1 depicts an example data flow for a VDR-SDR system, according to an embodiment of the present invention.

Fused, region-based, inter-color image prediction is described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to coding images with high dynamic range. An embodiment fuses region-based predictors and allows a VDR image to be expressed in relation to its corresponding SDR representation and a set of region-based prediction functions. An input image is divided into non-overlapping regions. For each of the non-overlapping regions, first output data is predicted with a first prediction function, parameters related thereto and region-specific input image data. For each region with prior-predicted neighbor regions, a pixel border portion, adjacent to the neighbor region, is defined. For the pixels in the defined border portion, second output data is predicted with a second prediction function, parameters related thereto, input image data from the border portion of the current region and input prediction parameter data from the neighbor region. The first output prediction data is fused with the second output data to predict a final set of output prediction values.

Given a pair of corresponding VDR and SDR images, e.g., images that represent the same scene but at different levels of dynamic range, this section describes methods that allow an encoder or decoder to approximate the VDR image in terms of the SDR image and a set of region-based prediction functions. Given a currently predicted region and prior-predicted regions, pixels at the left, top, and corner border portions of the currently predicted region may be predicted by fusing outputs predicted using the current prediction function and current prediction parameters with outputs predicted using prediction function and parameters of the prior-predicted neighbor regions.

Embodiments of this invention relate to computing fused, region-based, predictors that allow for the efficient layered coding, transmission, and decoding of VDR data. As used herein, the terms "fuse," "fused," "fusing" and "fusion" relate to applying a set of functions to combine or merge the outputs of prediction functions.

In an example embodiment of the present invention, image frames are divided into non-overlapping regions and a VDR prediction function is computed for each region according to a prediction model. Given a current region and prior-predicted neighbor regions, pixels at the left, top, and corner border portions of the current region may be predicted by fusing outputs predicted using the current prediction function and current prediction parameters with outputs predicted using prediction function and parameters of the prior-predicted neighbor regions.

Example VDR-SDR System

FIG. 1 depicts an example data flow in a VDR-SDR system 100, according to an embodiment of the present invention. An HDR image or video sequence is captured using a capture device, e.g., an HDR camera 110. Following capture, the captured image or video is processed by a mastering process to create a target VDR image 125. The mastering process may incorporate a variety of processing steps, such as: editing, primary and secondary color correction, color transformation, and noise filtering. The VDR output 125 of this process represents the director's intent on how the captured image will be displayed on a target VDR display.

The mastering process may also output a corresponding SDR image 145, representing the director's intent on how the captured image will be displayed on a legacy SDR display. The SDR output 145 may be provided directly from mastering circuit 120 or it may be generated by a separate VDR-to-SDR converter 140.

In an example embodiment, the VDR 125 and SDR 145 signals are input into an encoder 130. Encoder 130 creates a coded bitstream which reduces the bandwidth required to transmit the VDR and SDR signals. Moreover, encoder 130 functions to create a signal that allows a corresponding decoder 150 to decode and render either the SDR or VDR signal components. In an example implementation, encoder 130 may be a layered encoder, such as one of those defined by the MPEG-2 and H.264 coding standards, which represents its output as a base layer, an optional enhancement layer, and metadata. As used herein, the term "metadata" relates to any auxiliary information that is transmitted as part of the coded bit-stream and assists a decoder to render a decoded image. Such metadata may include, but are not limited to, such data as: color space or gamut information, dynamic range information, tone mapping information, or other predictor and quantizer operators, such as those described herein.

On the receiver, decoder 150 uses the received coded bit-streams and metadata to render either an SDR image or a VDR image, according to the capabilities of the target display. For example, a legacy SDR display may use only the base layer information to render an SDR image. In contrast, an advanced SDR display or a VDR display may use information from all input layers and the metadata to render a VDR signal.

Figure 2:
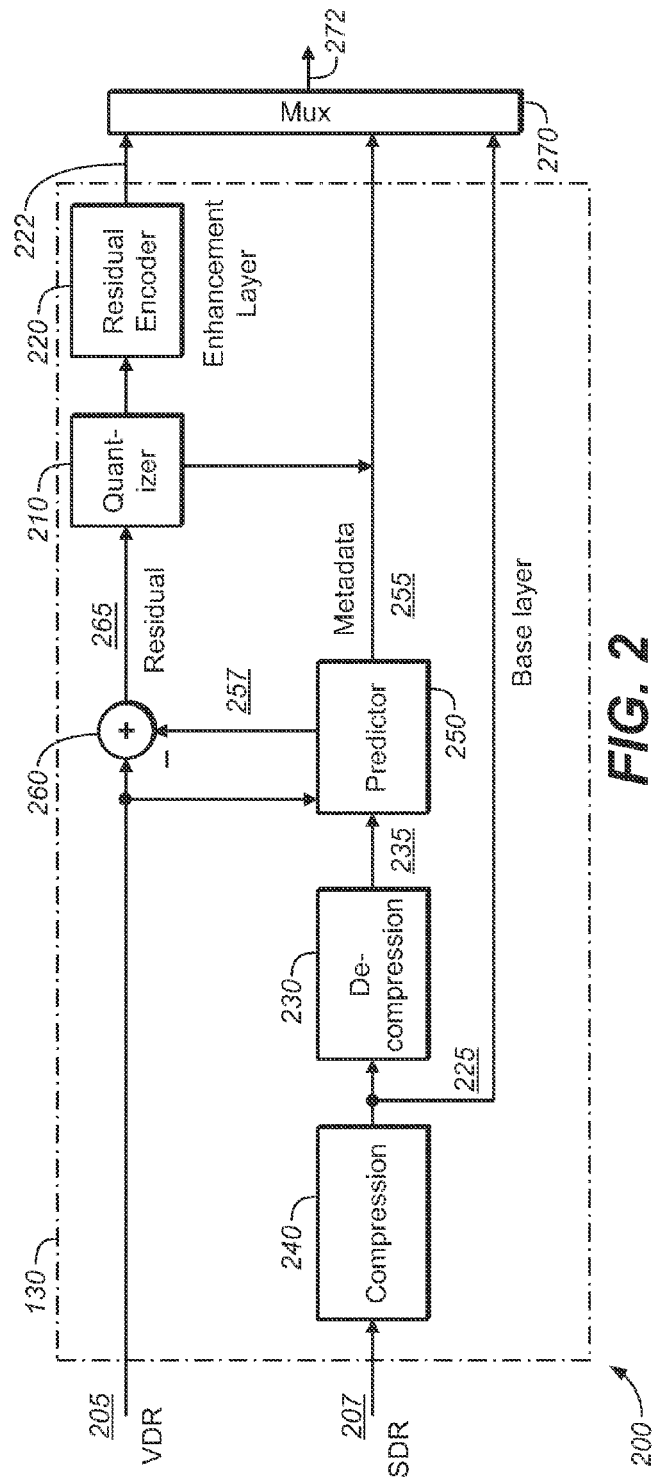
FIG. 2 depicts an example layered VDR encoding system according to an embodiment of the present invention.

FIG. 2 depicts an example implementation of encoder 130 incorporating the methods of this invention. In FIG. 2, SDR input 207 is typically 8-bit, 4:2:0, ITU Rec. 709 data; however the methods of this embodiment apply to other SDR representations as well. For example, some implementations may use an enhanced SDR input, SDR', which may have the same color space (primaries and white point) as SDR, but may use high precision, say 12-bits per pixel, with all color components at full spatial resolution (e.g., 4:4:4 RGB). The SDR input 207 is applied to compression system 240. Depending on the application, compression system 240 can be either lossy, such as one according to the H.264 or MPEG-2 standards, or lossless. The output of the compression system 240 may be transmitted as a base layer 225. To reduce drift between the encoded and decoded signals, encoder 130 may follow compression process 240 with a corresponding decompression process 230. Signal 235 represents the SDR input as it will be received by a decoder. Predictor 250 can be a linear or non-linear predictor as described for example in PCT application PCT/US2012/033605, filed Apr. 13, 2012, "Multiple color channel multiple regression predictor", by G-M. Su et al., or it can be a non-linear predictor, as described for example in PCT application PCT/US2012/033651, filed on Apr. 13, 2012, "Image prediction based on primary color grading model," by G-M. Su et al. Predictor 250, using input VDR 205 and SDR 235 data will create signal 257 which represents an approximation or estimate of input VDR 205. Adder 260 subtracts the predicted VDR 257 from the original VDR 205 to form output residual signal 265. Residual 265 may also be coded by another lossy or lossless encoder 220, such as those defined by the MPEG standards, and may be multiplexed in the output bit stream and transmitted to the decoder as an enhancement layer.

Predictor 250 may also provide the prediction parameters being used in the prediction process as metadata 255. Since prediction parameters may change during the encoding process, for example, on a frame by frame basis, or on a scene by scene basis, these metadata may be transmitted to the decoder as part of the data that also include the base layer and the enhancement layer.

Residual 265 represents the difference between two VDR signals, thus it is expected to be represented by more than 8-bits per color component. In many possible implementations, encoder 220 may not be able to support the full dynamic range of this residual signal. In an example implementation, the residual may be 16 bits and the residual encoder 220 may be a standard H.264, 8-bit, encoder. In order for encoder 220 to accommodate the dynamic range of residual 265, quantizer 210 quantizes residual 265 from its original bit-depth representation (say 12 or 16 bits) to a lower bit-depth representation. The quantizer parameters may also be multiplexed into the metadata bit-stream 255. In an example implementation, base layer 225, metadata 255, and enhancement layer 222 may be multiplexed together in multiplexer 270 to form a single coded bit-stream 272 to be transmitted to both SDR and VDR decoders.

FIG. 3 depicts in more detail an example implementation of decoder 150. Decoding system 300 receives a coded bit-stream 302 that comprises a base layer 327, an enhancement layer (or residual) 322, and metadata 325, which are extracted following demultiplexing 320. For example, in a VDR-SDR system, the base layer 327 may represent the SDR representation of the coded signal and the metadata 325 may include information related the prediction (250) and quantization (210) steps used in the encoder. Encoded base layer 327 is decoded using base layer decoder 330 to output decoder SDR signal 337. Encoded residual 322 is decoded (340), de-quantized (350), and added to the output 395 of the predictor 390 to generate the output VDR signal 370.

Prediction 250 may be based on a variety of input data, including: a group of pictures, a single frame or picture, or multiple regions within a picture. Partitioning an image into regions and computing prediction functions for each region results into higher overhead requirements to signal those prediction parameters to the decoder; however, under certain circumstances, it may increase prediction accuracy and improve overall coding quality. One example of improved performance under region-based prediction is when the SDR content is color graded from the VDR content using both primary (global) color grading and secondary (local) color grading.

Region-based prediction may yield block-like discontinuities and artifacts. For example, pixels across the boundaries of two regions may have similar characteristics, but in each region, predictions are performed based on the average characteristics of each region. An embodiment minimizes region-based prediction artifacts. In pixel areas across the top, left, and corner boundaries of the current region, pixels may be predicted by fusing outputs predicted using the current prediction function and current prediction parameters with outputs predicted using prediction function and parameters of prior-predicted neighbor regions.

Region-Based Prediction

FIG. 4 depicts input and output interfaces of predictors 250 and 390 according to an example implementation of this invention. From FIG. 4, predictor 410 may receive input vectors s 420 and M 430, representing SDR image data (235) and prediction parameters respectively, and may output vector $\hat{v}$ 440, representing the predicted value of the original VDR input v 205.

Example Notation and Nomenclature

Assuming images are represented by pixels, where each pixel has n color components, in an example implementation where n=3, denote the three color components of the i-th pixel in the SDR image 235 as $$s_i = [s_{i1} s_{i2} s_{i3}]. \quad (1)$$

Denote the three color components of the i-th pixel in the VDR input 205 as $$v_i = [v_{i1} v_{i2} v_{i3}] \quad (2)$$

Denote the predicted three color components of the i-th pixel in predicted VDR 257 as $$\hat{v}_i = [\hat{v}_{i1} \hat{v}_{i2} \hat{v}_{i3}]. \quad (3)$$

In a given region of an image, denote the total number of pixels in one color component as p. In equations (1-3), image pixels may be in RGB, YUV, YCbCr, XYZ, or any other color representation. While equations (1-3) assume a three-color representation for each pixel in an image or video frame, the methods described herein can be easily extended to image and video representations with more than three color components per pixel, or to image representations where one of the inputs may have pixels with a different number of color components than the other input.

Given a region r of p pixels, denote as $P_r(s_i, M)$ a prediction function for that region, so that $$\hat{v}_i = P_r(s_i, M) \quad (4)$$

where M denotes a set of prediction parameters and $s_1$ denotes an input vector. In one example implementation, prediction function $P_r()$ can be a linear or non-linear function based on multivariate multiple-regression (MMR) models, as described in U.S. application 61/475,359. In another example implementation, prediction function $P_r(\ )$ can be a non-linear function, such as one based on a SOP (slope, power, and offset) color-grading model, as described in U.S. application 61/475,372. For example, under the first-order MMR model described in U.S. application 61/475,359, $$P_r(s_i, M) = S_i M \quad (5)$$

where $$M = \begin{bmatrix} n_{11} & n_{12} & n_{13} \\ m_{11}^{(1)} & m_{12}^{(1)} & m_{13}^{(1)} \\ m_{21}^{(1)} & m_{22}^{(1)} & m_{23}^{(1)} \\ m_{31}^{(1)} & m_{32}^{(1)} & m_{33}^{(1)} \end{bmatrix}, \quad (6)$$

is a 4×3 matrix of prediction coefficients and $$S_i = [1 s_i] = [1 s_{i1} s_{i2} s_{i3}], \quad (7)$$

is a 1×4 input vector.

Fused Region-Based Prediction

FIG. 5 depicts input frame 510 divided into non-overlapping regions 512-526, according to an example implementation of this invention. For example, if input frame 510 has 1920×1080 pixels, frame 510 may be divided into eight regions, each 480×540 pixels. Alternatively, image 510 may be divided into 4×4 regions, 2×2 regions, or any other configuration. The total number of regions represents a trade-off between reducing the prediction error but at the expense of increasing the number of prediction parameters to be signaled from the encoder to the decoder.

Denote as $M_{(x,y)}$ the prediction parameters associated with region (x,y) of an image, where x and y denote the horizontal and vertical position of the region with respect to the top left corner of the input image. For example, in FIG. 5, region 512 is located in position (0,0) and region 522 is located in position (1,1).

Figure 6C:
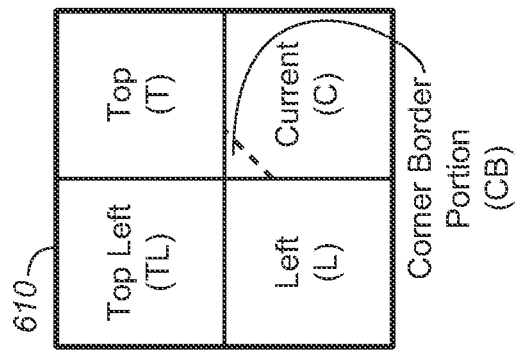
FIG. 6A, FIG. 6B, and FIG. 6C depict examples of neighboring border portions according to an embodiment of this invention.
Figure 6B:
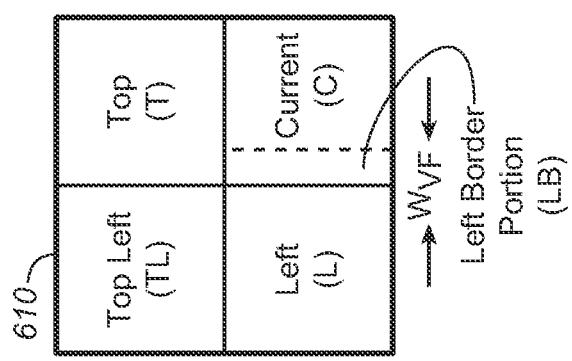
Figure 6A:
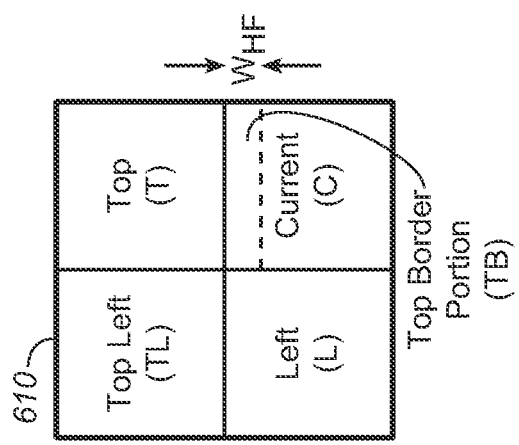

FIG. 6A, FIG. 6B, and FIG. 6C depict four neighbor regions of an input image according to an example embodiment of this invention. Region C is the current region to be predicted. Depending on its location within an image, region C may have up to three possible prior-predicted neighbor regions: a top region (T), a left region (L), and a top left (TL) region. An example implementation of fusing prediction functions is described herein.

Denote as $M_{(x,y)}$ the prediction parameters for the current region C. Denote also the following parameters:

$W_{(x,y)}$: width of region (x,y)
$G_{(x,y)}$: height of region (x,y)
$W_{HF}$: width of fusion area across the horizontal axis (top border portion area TB)
$W_{VF}$: width of fusion area across the vertical axis (left border portion area LB)
$f_{H1}(i)$: fusion function 1 in horizontal direction
$f_{H2}(i)$: fusion function 2 in horizontal direction
$f_{V1}(i)$: fusion function 1 in vertical direction
$f_{V2}(i)$: fusion function 2 in vertical direction
$\hat{v}_{(x,y)(i,j)} = P_{(x,y)}(s_{(x,y)(i,j)}, M_{(x,y)})$: 1×3 vector representing output predicted pixels in region (x,y) at pixel (i,j) using prediction function $P_{(x,y)}(\ )$, input data vector $s_{(x,y)(i,j)}$, and prediction parameters $M_{(x,y)}$ In some embodiments, prediction function $P_{(x,y)}(\ )$ may be the same for all regions of an image. In some other embodiments, each region may select a prediction function from a set of predefined functions. Then, the index of the selected prediction function (say, $P_{(x,y)}(\ )$) may be signaled to the decoder along with its corresponding prediction parameters $M_{(x,y)}$, as part of the metadata embedded in the coded bit stream. Similarly, fusion functions may be global or may depend on the prediction functions being used.

FIG. 6A depicts an example embodiment of this invention wherein improved prediction may be achieved by computing the predicted output values of the top border portion TB of the current region using a fused combination of predictor functions by both the current region and its top neighbor T. For example, in the top border portion TB, predicted pixels can be computed according to $$\hat{v}_{(x,y)(i,j)} = f_{V1}(j)\hat{v}_{(x,y)(i,j)} + f_{V2}(j)P_{(x,y-1)}(s_{(x,y)(i,j)}, M_{(x,y-1)}). \quad (8)$$

where j=0 to $W_{HF}$−1 and i=0 to $W_{(x,y)}$−1.

In an example implementation, the first vertical fusion functions may be defined as $$f_{V1}(j) = (1+j)/(W_{HF}+1). \quad (9)$$

Assuming that normalized pixel values are within the range from 0 to 1, the second vertical fusion function may be defined as:

$$f_{V2}(k) = 1 - f_{V1}(j). \quad (10)$$

However, other fusion functions, linear or non-linear, can be chosen as deemed appropriate for a given implementation. From equations (8-10), at the top border portion, predicted pixels using prediction function and parameters from the top region are weighted more than predicted pixels using prediction function and parameters from the current region.

FIG. 6B depicts an example embodiment of this invention wherein improved prediction may be achieved by computing the predicted output values of the left border portion LB of the current region using a fused combination of predictor functions by both the current region and its left neighbor L. For example, in the left border portion LB, predicted pixels can be computed according to $$\hat{v}_{(x,y)(i,j)} = f_{H1}(i)\hat{v}_{(x,y)(i,j)} + f_{H2}(i)P_{(x-1,y)}(s_{(x,y)(i,j)}, M_{(x-1,y)}). \quad (11)$$

where i=0 to $W_{VF}$−1 and j=0 to $H_{(x,y)}$−1.

In an example implementation, the horizontal fusion functions may be defined as $$f_{H1}(i) = (1+i)/(W_{VF}+1). \quad (12)$$

Assuming that normalized pixel values are within the range from 0 to 1, the second vertical fusion function may be defined as:

$$f_{H2}(i) = 1 - f_{H1}(i). \quad (13)$$

However, other fusion functions, linear or non-linear, can be chosen as deemed appropriate for a given implementation. From equations (11-13), at the left border portion, predicted pixels using prediction function and parameters from the left region are weighted more than predicted pixels using prediction function and parameters from the current region.

As denoted in FIG. 6C, in certain embodiments of this invention, improved prediction may be achieved by also computing the predicted output values of the corner border portion CB of the current region using a fused combination of predictor functions by both the current region and its top left TL neighbor. For example, in the corner border portion CB (e.g., one with a triangular shape), predicted pixels can be computed according to $$\hat{v}_{(x,y)(i,j)} = f_{H1}(w)\hat{v}_{(x,y)(i,j)} + f_{H2}(w)P_{(x-1,y-1)}(s_{(x,y)(i,j)}, M_{(x-1,y-1)}). \quad (14)$$

where, for i=0 to $W_{VF}$−1 and j=0 to $W_{HF}$−i, w=max (i,j).

In an example embodiment, predicted output values computed using equations (11-14) may be further clipped or rounded-off to match the requirements of the specific encoder or decoder implementation.

Figure 7:
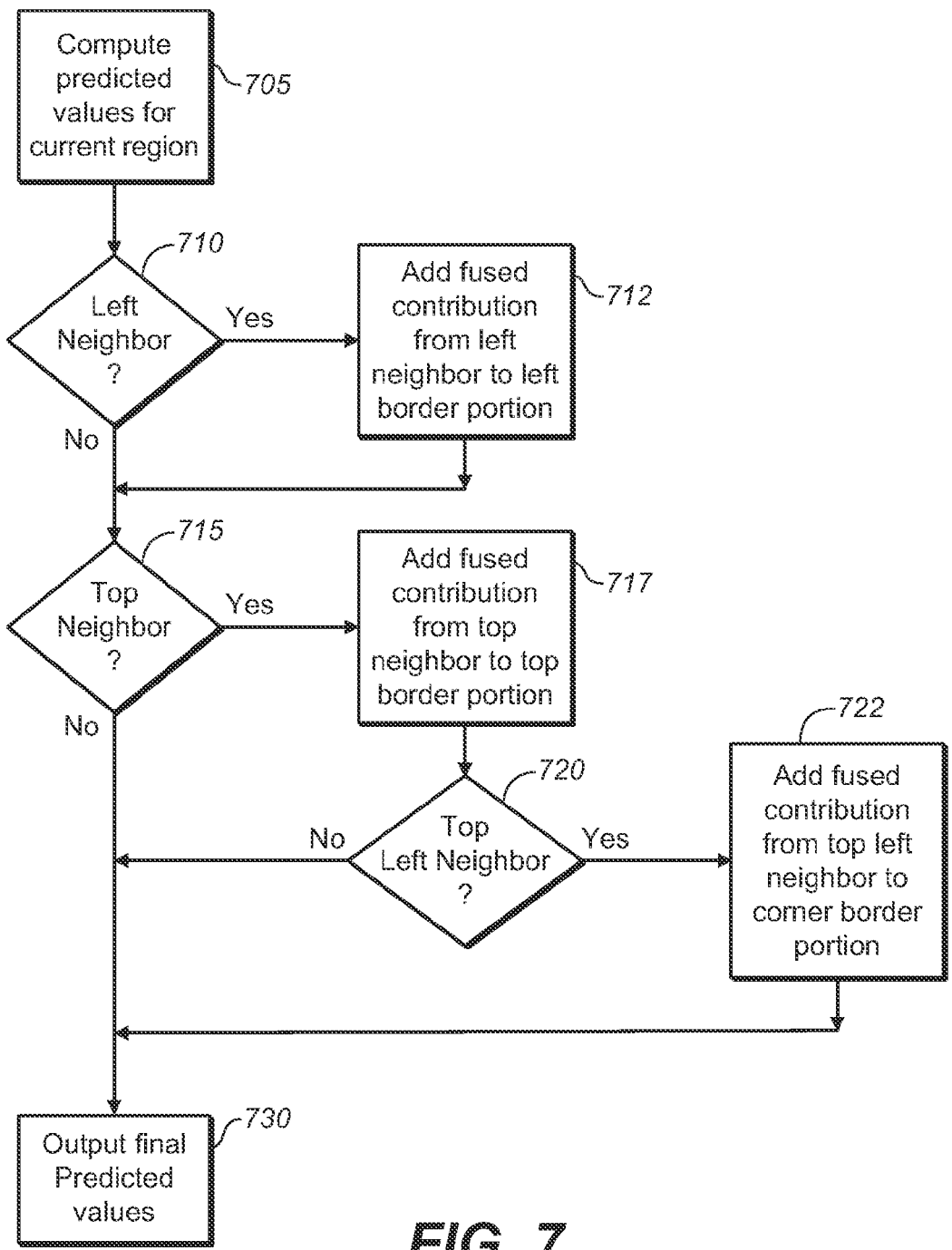
FIG. 7 depicts an example region-based prediction process according to an embodiment of this invention.

FIG. 7 depicts an example processing flow in an embodiment of this invention. For a given region (x,y), given input data $s_{(x,y)(i,j)}$, a prediction function $P_{(x,y)}(\ )$, and prediction parameters $M_{(x,y)}$, the predicted output values may be computed using equation (4) rewritten here as:

$$\hat{v}_{(x,y)(i,j)} = P_{(x,y)}(s_{(x,y)(i,j)}, M_{(x,y)}) \qquad (15)$$

If the current block has no left or top neighbors, then there is no more processing and the predictor can output the predicted values (730). If the current region has a left neighbor (712), then for pixels of the current region in a left border portion (LB), the predictor may combine fused output prediction values of the current region (C) with a fused contribution of predicted values computed using the prediction function and associated prediction parameters from the left region (L) according to equation (11). If the current region has a top neighbor (T), then for pixels of a top border portion (TB), the predictor may combine fused output prediction values of the current region (C) with a fused contribution of predicted values computed using the prediction function and associated prediction parameters from the top region (T) according to equation (8). Finally, if the current region has a top left neighbor (TL), then for pixels of the current region in a corner border portion (CB), the predictor may combine fused output prediction values of the current region (C) with a fused contribution of predicted values computed using the prediction function and associated prediction parameters from the top left region (TL) according to equation (14). After all contributions using prediction functions from any neighbor regions have been considered, the predictor outputs the final predicted values (730).

Embodiments of the present invention may be implemented either on an image encoder (200) or an image decoder (300).

Embodiments of the present invention can easily be extended by people of ordinary skill to incorporate additional fused overlapped predictors, for example, to the right or to the bottom of the current region.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control or execute instructions relating to fused, region-based, image prediction, such as those described herein. The computer and/or IC may compute any of a variety of parameters or values that relate to the fused, region-based prediction as described herein. The image and video dynamic range extension embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement fused, region-based prediction methods as described above by executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to applying fused, region-based prediction in coding VDR and SDR images are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. An image prediction method comprising:
   receiving an input image that comprises pixels;
   dividing the input image into a plurality of non-overlapping regions;
   assigning one of the non-overlapping regions as a current region;
   (a) for the current region, predicting first output data, wherein the first output data is predicted with a first prediction function, input image data specific to the current region and input prediction parameters data for the first prediction function;
   (b) determining a neighbor region that is adjacent to the current region, wherein the neighbor region represents another of the one or more non-overlapping regions;
   defining a border portion of the current region that is proximate to a border of the neighbor region, wherein the border portion of the current region lies outside the neighbor region;
   for the pixels in the border portion, predicting second output data, wherein the second output data is predicted with a second prediction function, input image data from the border portion and input prediction parameter data from the neighbor region, wherein the neighbor region comprises previously predicted output prediction values from a previously fused output;

fusing the first output prediction data with the second output data into a fused output; and predicting a final set of output prediction values from the fused output.

2. The method of claim 1 further comprising:
repeating step (b) for all neighbor regions adjacent to the current region, wherein said neighbor region has been previously processed according to the predicting step (a).

3. A non-transitory computer-readable storage medium having stored thereon computer-executable instruction for executing a method with a computer in accordance with claim 2.

4. The method as recited in claim 1 wherein the first prediction function and the second prediction function each comprise an essentially identical value.

5. The method as recited in claim 1 wherein a value of the first prediction function is independent of a value of the second prediction function.

6. The method as recited in claim 1 wherein a value of the second prediction function is independent of a value of the first prediction function.

7. The method as recited in claim 1 wherein a value of the first prediction function is distinct from a value of the second prediction function.

8. The method as recited in claim 7 wherein a value of the first prediction function differs from a value of the second prediction function.

9. The method of claim 1 wherein the previously-predicted neighbor region comprises a region that is adjacent to the border portion that, in relation to a frontal and top-up perspective of the image, is disposed to the left of the current region.

10. The method as recited in claim 1 wherein the previously-predicted neighbor region comprises a region that is adjacent to the border portion that, in relation to a frontal and top-up perspective of the image, is disposed at the top of the current region.

11. The method as recited in claim 1 wherein the previously-predicted neighbor region comprises a region that is adjacent to the border portion that, in relation to a frontal and top-up perspective of the image, is disposed at the top and to the left of the current region.

12. The method of claim 1 wherein the step of fusing of the first output prediction data with the second output data into a fused output comprises:

multiplying the first output prediction data with a first fusion function, wherein a first result is computed;

multiplying the second output prediction data with a second fusion function, wherein a second result is computed.

13. The method as recited in claim 12 wherein the step of predicting a final set of output prediction values from the fused output comprises:

adding the first result and the second result, wherein a final set of output prediction values is computed;

replacing the first output prediction data with the final set of output prediction values.

14. The method of claim 12 wherein, for a predicted pixel in the border portion, the output of the first fusion function is linearly proportional to the distance of the predicted pixel from the border between the current region and the neighbor region.

15. An apparatus comprising a processor and configured to perform the method recited in claim 14.

16. The method of claim 12 wherein, for a predicted pixel in the border portion, the output of the second fusion function is inversely proportional to the distance of the predicted pixel from the border between the current region and the neighbor region.

17. The method of claim 12 wherein, for a predicted pixel value that has a normalized pixel value between 0 and 1, the outputs of the first fusion function and the second fusion function sum to a value of one.

18. An apparatus comprising a processor and configured to perform the method recited in claim 12.

19. A non-transitory computer-readable storage medium having stored thereon computer-executable instruction for executing a method with a computer in accordance with claim 1.

* * * * *